United States Patent

[11] 3,591,835

[72] Inventor Clifford E. Sloop
 2230 10th St., Columbus, Ga. 31906
[21] Appl. No. 799,190
[22] Filed Feb. 14, 1969
[45] Patented July 6, 1971
 Continuation-in-part of application Ser. No. 678,975, Oct. 30, 1967, now Patent No. 3,440,330.

[54] METER BOX COVER ASSEMBLY WITH PROTECTIVE COVER PLATE
 5 Claims, 8 Drawing Figs.
[52] U.S. Cl. ............................................ 317/109, 174/52, 317/107
[51] Int. Cl. ........................................... H02b 9/00, H05k 5/03
[50] Field of Search ................................. 174/52; 317/104—111

[56] References Cited
UNITED STATES PATENTS
3,123,744 3/1964 Fisher ........................ 317/109 X
2,870,238 1/1959 Davis ......................... 317/109 X
2,991,398 7/1962 Strong ........................ 317/109
3,440,330 4/1969 Sloop ......................... 317/110 X Primary Examiner—Lewis H. Myers
Assistant Examiner—Gerald P. Tolin
Attorney—Newton, Hopkins & Ormsby ABSTRACT: A meter box cover assembly for use with an electricity meter socket box when the electricity meter is removed and which has an annular flange that fits against a corresponding flange on an electricity meter when it is in place. The cover assembly comprises a cover plate for insertion over the opening in the socket box and against the outer surface of the annular flange of the box, and a locking bracket extending from one edge of the cover plate and arranged to extend under and grip the rear surface of the flange of the socket box. A slot is formed in the cover plate on the opposite side of the cover plate from the locking bracket and a keeper element is inserted about an arc of the flange and the cover plate is inserted over the keeper element. The portion of the keeper element protruding through the cover plate receives a lock, or similar fastening means, to prevent the cover assembly from being removed from the socket box or the socket box being illegally connected for use.

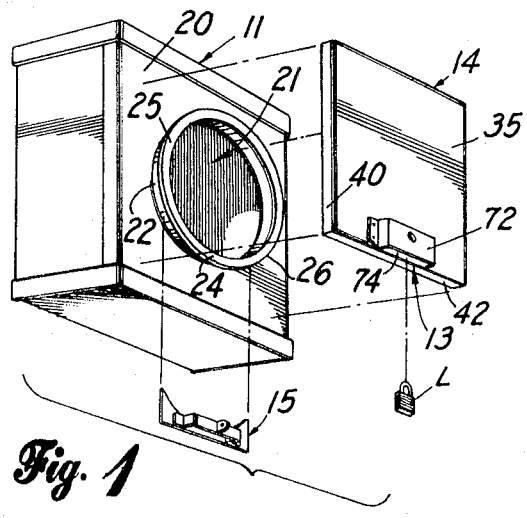
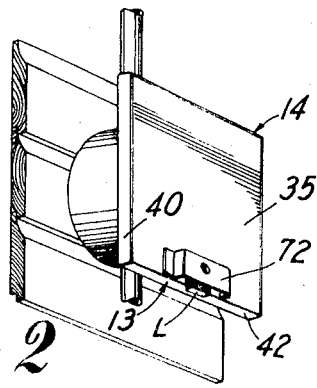
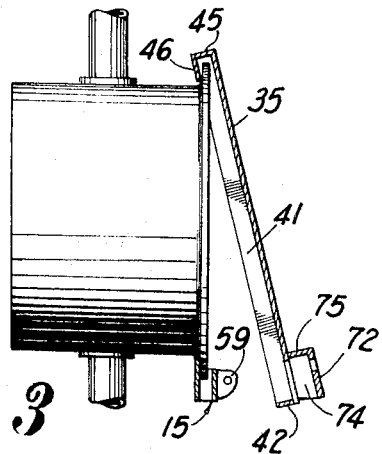
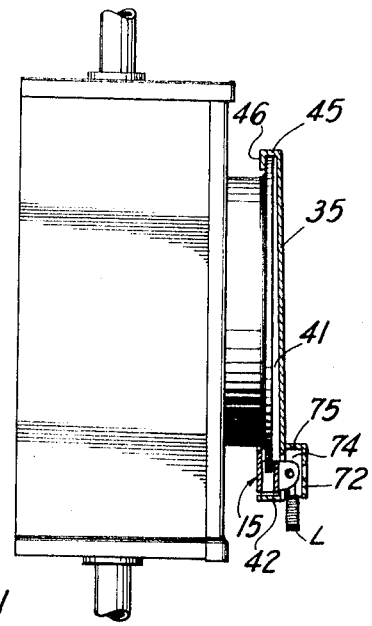
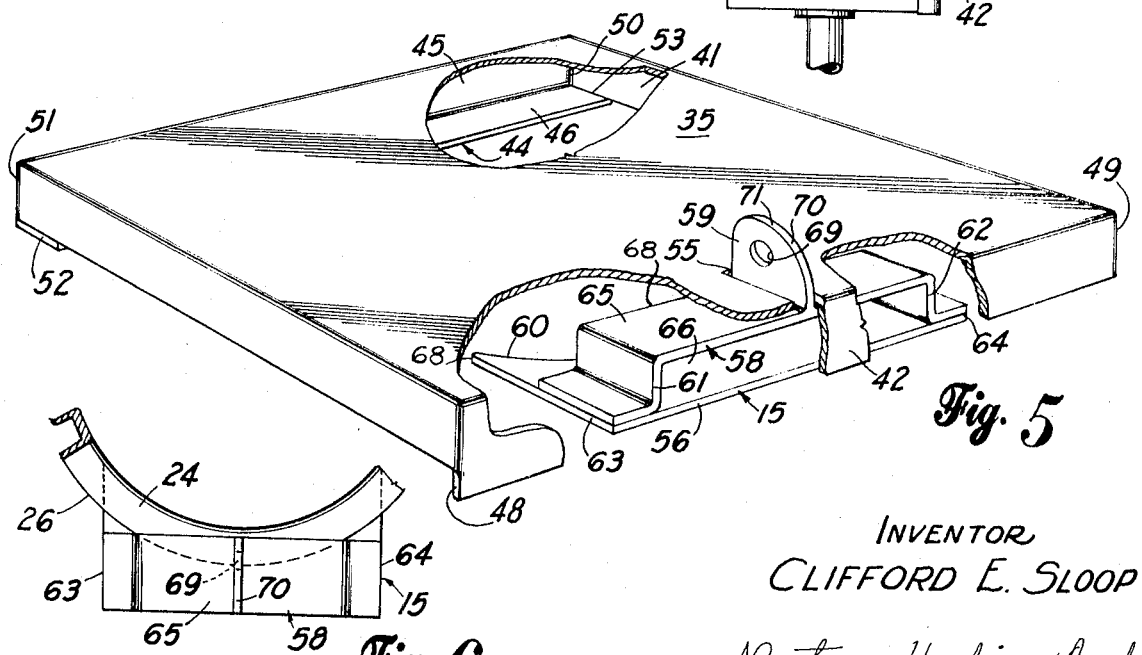
INVENTOR
CLIFFORD E. SLOOP
Newton, Hopkins, & Ormsby
ATTORNEYS

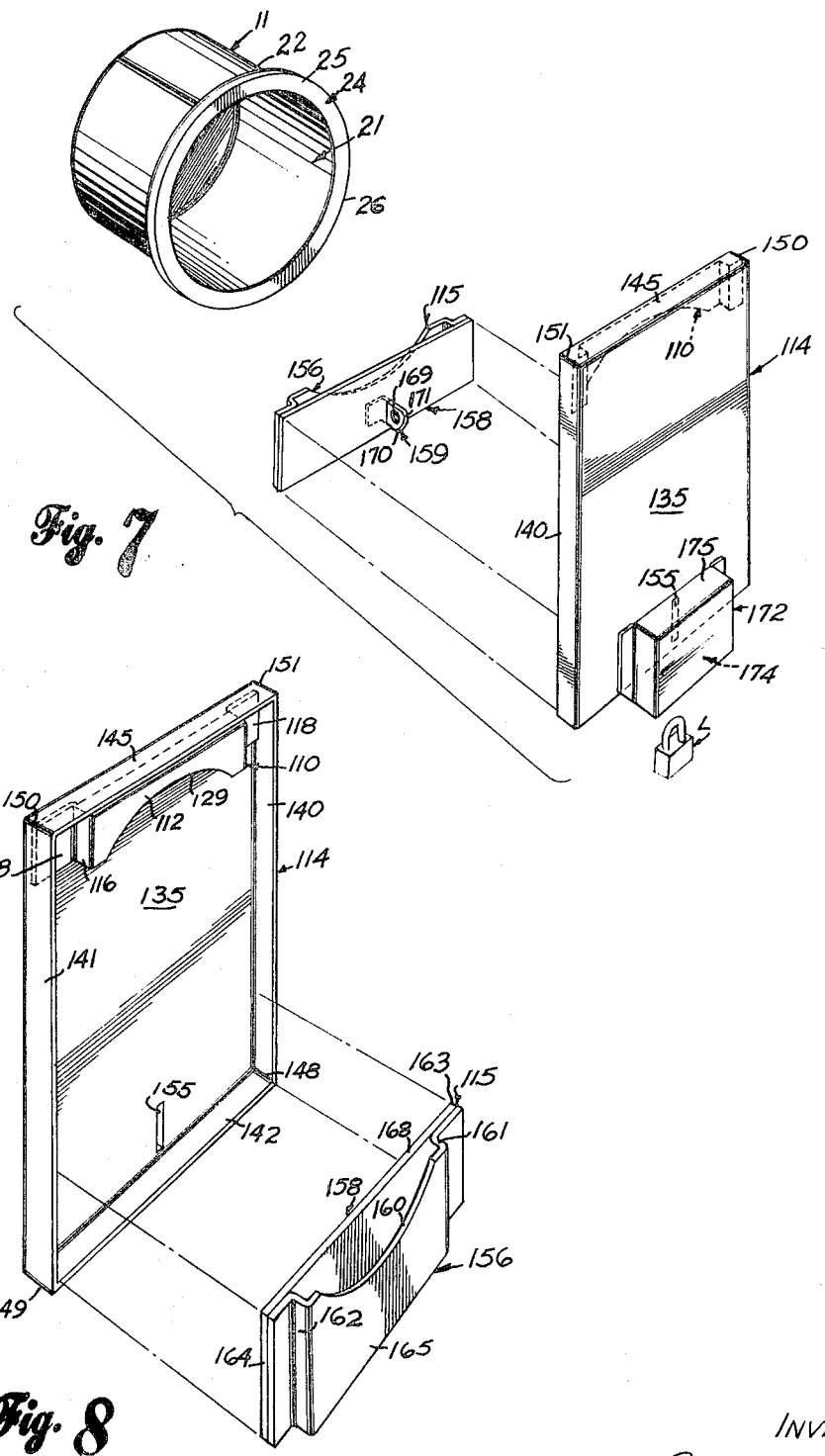

METER BOX COVER ASSEMBLY WITH PROTECTIVE COVER PLATE

CROSS-REFERENCE TO RELATED APPLICATION

This application is a continuation-in-part of my copending application, Ser. No. 678,975, filed Oct. 30, 1967, now Pat. No. 3,440,330, for "Meter Box Locking Assembly."

BACKGROUND OF THE INVENTION

Since about 1930, electricity utility companies have utilized electricity meters to measure the flow of electricity which comprise a socket box or housing and a meter unit which is plugged into the socket box. The socket box may vary in construction but always includes a radially outwardly extending annular flange that usually extends away from this wall upon which the socket box is mounted, and which abuts the enlarged circular base of the meter unit.

In recent years, the use of electricity has increased in homes and in industry so that the bill for electricity service in the average home has increased from an average of about $3.00 per month in 1930 to the current average of about $20.00 per month. The machine billing systems now used by utility companies is such that 2 or 3 months of billings may go unpaid before the service to a home is disconnected. After the service has been disconnected, many customers reconnect their service themselves without authorization and continue to use the service without paying for it or paying for the service previously used. Frequently, these customers will move to another location after reconnecting their service, and it is difficult for the utility company to discover the illegal reconnect of the location of the customer. When the customer has moved to a new location, he may apply for and obtain electrical service under another name.

SUMMARY OF THE INVENTION

This invention relates to a meter socket box cover assembly which has sturdy and rigid construction to prevent unauthorized connection of the service from the socket box when a meter unit is not installed. The cover assembly includes a cover plate, and a locking bracket extending from one edge of the cover plate for insertion about an arc of the annular flange of a socket box. A keeper element is provided for insertion about the annular flange of the socket box at a position about the annular flange opposite from the locking bracket of the cover plate. A protruding portion of the keeper element is inserted through the cover plate, and a lock or similar securing device is connected to the protruding portion of the keeper element to secure the locking assembly in place.

Thus, it is an object of this invention to provide a meter socket box cover assembly which prevents unauthorized connection or reconnection of electricity meters.

Another object of this invention is to provide a meter socket box cover assembly which is simple in construction, easily attached to a socket box, fits the standard socket box and which is difficult to remove without a key.

Other objects, features and advantages of the present invention will become apparent upon reading the following specification, when taken in conjunction with the accompanying drawings.

BRIEF DESCRIPTION OF THE DRAWINGS

FIG. 1 is an exploded perspective view of a socket box, and the cover assembly;

FIG. 2 is a perspective view of the assembled socket box and the cover assembly;

FIG. 3 is a side elevational view of a circular socket box, showing the cover assembly in cross section, as the cover plate is pivoted into position, and the keeper in exploded position;

FIG. 4 is a side elevational view of a rectangular socket box, showing the cover assembly in cross section;

FIG. 5 is a perspective view of the cover plate, with parts broken away, and the keeper element;

FIG. 6 is a front elevational view of the keeper element, showing the lower portion of the annular flange of the socket box in dotted lines;

FIG. 7 is an exploded perspective view of a second embodiment of the invention; and, FIG. 8 is another exploded perspective view of the cover assembly of FIG. 7.

DESCRIPTION OF THE EMBODIMENTS

Referring now more particularly to the drawing, in which like numerals indicate like parts throughout the several views, FIG. 1 shows a meter housing or socket box 11, cover plate 14, and keeper 15. The socket box 11 is of conventional construction.

Socket box 11 includes a front face 20 which defines a central aperture 21. Neck 22 extends outwardly about aperture 21 and terminates in radially extending annular flange 24. Annular flange 24 includes an abutting surface 25, a peripheral edge 26, and a rear surface (not shown). The diameter of annular flange 24 is approximately equal to the diameter of the circular base of an electricity meter (not shown). When the meter is connected to socket box 11, its studs are inserted into the jaws of the socket box, and its circular base is placed in abutting relationship with annular flange 24 of socket box 11.

As is shown in FIG. 5, cover plate 14 includes a flat plate 35. The side edges of plate 35 terminate in rearwardly turned sidewalls 40 and 41 while the bottom edge terminates in rearwardly turned bottom wall 42. The upper edge of plate 35 terminates in an L-shaped bracket 44 which includes rearwardly turned spacer wall 45 and downwardly turned gripping wall 46. Sidewalls 40 and 41, bottom wall 42 and spacer wall 45 all extend substantially perpendicular to the plane of plate 35 and are connected together at their common edges 48, 49, 50, and 51. Gripping wall 46 is connected at its ends to the bottom edge of sidewalls 40 and 41, at 52 and 53. Thus, cover plate 14 is rigidly constructed, even when fabricated of relatively light metal.

Plate 35 includes slot 55 which extends upwardly from bottom wall 42. Slot 55 is formed so that it extends in alignment with the axis of aperture 21, and is on the side of plate 35 opposite from L-shaped bracket 44.

Keeper 15 includes keeper plate 56, spacer bracket 58, and locking tab 59. Keeper plate 56 has an arcuate edge 60 which has a radius of curvature approximately equal to the radius of curvature of the outside surface of neck 22 of socket box 11. Spacer bracket 58 is U-shaped and includes legs 61 and 62 which are connected to keeper plate 56 adjacent its side edges 63 and 64, and base leg 65 which is maintained in spaced relationship with respect to keeper plate 56. Thus, space 66 is defined by keeper plate 56 and spacer bracket 58. Space 66 extends over a substantial width of keeper plate 56 so that legs 61 and 62 of spacer bracket 58 are displaced from arcuate edge 60 of keeper plate 56, yet arcuate edge 60 curves toward the plane of the upper edge 68 of the spacer bracket 58. Locking tab 59 is located centrally of spacer bracket 58 and defines laterally extending aperture 69. The lower edge 70 of locking tab 59 is rounded and merges into the outer edge 71 so as to form a curved surface.

A U-shaped security member 72 is attached to the front of the plate 35 and extends across the slot 55 and spaced thereabove so that when the shank of a lock L is positioned through the aperture 69 in the locking tab 59 when the cover plate 14 is in position, the shank of the lock L will be covered. This prevents sawing or severing the lock L so that the cover assembly can be removed without unlocking lock L. The member 72 defines a space 74 of sufficient size between it and the plate 35 to permit the lock L to be installed. Top wall 75 prevents entry from the top of member 72.

It will be noted that plate 35 is wider than the maximum dimension of flange 24 so that sidewalls 40 and 41 extend back past the flange 24 closely adjacent thereto. This prevents a user of electricity from entering the housing 11 to connect with the electricity source even while the cover assembly is in place.

Referring now more particularly to FIGS. 7 and 8, in the drawing, the second embodiment of the cover assembly includes a cover plate 114 and a keeper 115. The second embodiment is also used with the socket box 11 of conventional construction with the same elements as that used with the first embodiment of the cover assembly.

As is shown in FIGS. 7 and 8, cover plate 114 includes a flat plate 135. The side edges of plate 135 terminate in rearwardly turned sidewalls 140 and 141 while the bottom edge terminates in rearwardly turned bottom wall 142. The upper edge of plate 35 terminates in a rearwardly turned top wall 145. Sidewalls 140 and 141, bottom wall 142 and top wall 145 all extend substantially perpendicular to the plane of plate 135 and are connected together at their common edges 148, 149, 150, and 151. Thus, cover plate 114 is rigidly constructed, even when fabricated of relatively light metal.

Plate 135 includes slot 155 which extends upwardly from bottom wall 142. Slot 155 is formed so that it extends in alignment with the axis of aperture 21, and is on the side of plate 135 opposite top wall 45 and bracket 110.

A U-shaped gripping bracket 110 is provided just under the top wall 145 for receipt over the flange 24 of the socket box 11. The bracket 110 includes central web portion 112; a pair of spacer legs 116, one on each end of the web portion 112; and a mounting lug 118 on each leg 116 opposite the web portion 112. The lugs 118 are attached to the inner surface of cover plate 114 and thus position the web portion 112 away from the inner surface of plate 135 sufficiently far for a portion of the flange 24 to be received between plate 135 and web portion 112. The lowermost edge 129 of the web portion 112 is curved to conform to the neck 22 of socket box 11. This serves to increase the holding capabilities of the cover assembly.

Keeper 115 includes keeper plate 156, spacer bracket 158, and locking tab 159. Keeper plate 156 has an arcuate edge 150 which has a radius of curvature approximately equal to the radius of curvature of the outside surface of neck 22 of socket box 11. Plate 156 is U-shaped and includes legs 161 and 162 which are connected to spacer bracket 158 adjacent its side edges 163 and 164, and base leg 165 which is maintained in spaced relationship with respect to keeper plate 156. Thus, space 166 is defined by keeper plate 156 and spacer bracket 158. Space 166 extends over a substantial width of keeper plate 156 so that legs 161 and 162 of plate 156 are displaced from arcuate edge 160 of keeper plate 156, yet arcuate edge 160 curves toward the plane of the upper edge 168 of the spacer bracket 158. The width of base leg 165 is substantially equal to the maximum width of keeper plate 156 so that the flange 24 is received between bracket 158 and leg 165 to firmly lock the cover assembly to socket box 11.

Locking tab 159 is located centrally of spacer bracket 158 and defines laterally extending aperture 169. The lower edge 170 of locking tab 159 is rounded and merges into the outer edge 171 so as to form a curved surface.

A U-shaped security member 172 is attached to the front of the plate 135 as with the first embodiment of the cover assembly and extends across the slot 155 and spaced thereabove so that when the shank of a lock L is positioned through the aperture 169 in the locking tab 159 when the cover plate 144 is in position, the shank of the lock L will be covered. This prevents sawing or severing the shank of lock L so that the cover assembly can be removed without unlocking lock L. The member 172 defines a space 174 of sufficient size between it and the plate 135 to permit the lock L to be installed. Top wall 175 prevents entry from the top of member 172.

OPERATION

In operation, the cover assembly is installed on the socket box 11 when the electricity meter (not shown) is not in place. The cover plate 14 is installed by placing the gripping wall 46 of the L-shaped bracket 44 behind the annular flange 24 and pivoting the cover plate 14 over the aperture 21 of the box 11. When cover plate 14 has been moved in a downward direction so that its L-shaped bracket 44 grips the rear surface of annular flange 25, as is shown in FIG. 3, the lower portion of cover plate 14 is pivoted away from flange 24 of box 11, and keeper 15 is positioned about an arc of annular flange 24 opposite that portion engaged by L-shaped bracket 44 of cover plate 14.

Cover plate 14 is then pivoted to the position as shown in FIG. 4, whereupon locking tab 59 of keeper 15 extends through slot 55 of cover plate 14. Bottom wall 42 of cover plate 14 maintains keeper 15 properly positioned about the lower arc of the flange 24, and lock L is inserted through aperture 69 of locking tab 59 to prevent cover plate 14 from being removed from meter 10. The curvature of lower and outer edges 70 and 71 of locking tab 59 is such that it urges cover plate 14 in a downward direction as it is pivoted over keeper 15, or urges keeper 15 in an upward direction, so that keeper 15 and cover plate 14 positively grip the flange 24 of socket box 11. Furthermore, the cover assembly 13 can be utilized with both circular socket boxes (FIG. 3) or rectangular socket boxes (FIG. 4) the only requisite being that the conventional radially extending flange abut the circular base of the meter.

The second embodiment of the invention is installed in the same manner as the first embodiment thereof. The cover plate 114 is positioned so that the curved edge 129 of bracket 110 fits behind the flange 24 of socket box 11. The keeper 115 is positioned opposite bracket 110 so that the arcuate edge 160 fits behind the flange 24 and the base leg 165 fits over the flange 24.

Cover plate 114 is then pivoted into position so that locking tab 159 extends through slot 155. The lock L is inserted through aperture 169 to lock the cover assembly in place.

It will be obvious to those skilled in the art that many variations may be made in the embodiments chosen for the purpose of illustrating the present invention.

I claim:

1. The combination with a socket housing having an outwardly extending annular mounting flange, said flange having substantially flat front and rear surfaces of the type utilized with an electricity measuring meter used in a dwelling, of a cover assembly including a cover plate, one edge of said cover plate having an L-shaped bracket which includes a spacer wall of a length generally equal to the width of the mounting flange of the socket housing, extending generally normal to the cover plate and a gripping wall extending back toward and generally parallel to the cover plate, said cover assembly being mounted on the socket housing with the cover plate in engagement with the front surface of the mounting flange, the spacer wall engaging the edge of the flange and the gripper wall engaging the rear surface of the flange, a keeper including a keeper plate and an apertured insertion member maintained in perpendicular spaced relation therefrom, said keeper plate engaging an arc of the rear surface of the mounting flange at a point removed from the point of engagement of the L-shaped bracket with the rear face of the flange and said insertion member projecting beyond the front surface of the mounting flange, a slot in the cover plate in which said insertion member is received, and an inwardly turned wall on the edge of the cover plate adjacent the keeper, said wall covering the outer edge of the keeper plate and serving to hold the parts in assembled position.

2. The combination with a socket housing having an outwardly extending annular mounting flange of the type utilized with an electricity measuring meter used in a dwelling, said mounting flange having substantially flat front and rear surfaces, of a cover assembly including a cover plate, said cover plate including at one edge an L-shaped bracket which includes a spacer wall, of a length generally equal to the width of the said mounting flange, extending generally normal to the cover plate, and a gripping wall extending back toward and generally parallel to the cover plate, said cover plate being placed over the front surface of said mounting flange and said gripping wall engaging the rear surface of said flange over an arc thereof; said combination further including a keeper plate and an apertured insertion member maintained in perpendicular spaced position relative to said keeper plate, said keeper plate being inserted behind an arc of said mounting flange at a position approximately 180° about the socket housing from said L-shaped bracket, the cover plate being provided at its edge opposite said L-shaped bracket with a slot, said insertion member being received in said slot, and the cover plate also having an inwardly turned wall along its last-mentioned edge, said wall fitting over said keeper and holding the parts in assembled condition.

3. The invention of claim 2 further including a security member attached to said cover plate and defining a space between said cover and security member over said slot.

4. The combination with a socket housing for use with a meter of the type utilized to measure the flow of electricity to a dwelling, said housing having a radially extending annular flange including front and rear surfaces, of a cover assembly including a cover plate positioned against the front surface of said annular flange and having an L-shaped bracket extending over an arc of the flange and engaging the rear surface of the flange over such arc, said combination further including a keeper including a keeper plate having an arcuate edge engaging an arc of the rear surface of said flange at a point approximately 180° from the point at which said flange is engaged by the L-shaped bracket, said keeper further including an insertion member projecting from the keeper, and said cover member being provided with a slot in which the insertion member is received, and with an inwardly turned wall on its edge opposite to that on which said L-shaped bracket is located, said wall fitting over the keeper and holding the parts in assembled position.

5. The combination of claim 4 further including a security member attached to said cover plate and defining a space between said cover plate and security member over said slot.